(12) United States Patent
Jammalamadaka et al.

(10) Patent No.: US 10,678,245 B2
(45) Date of Patent: Jun. 9, 2020

(54) SYSTEMS AND METHODS FOR PREDICTING ENTITY BEHAVIOR

(71) Applicant: GM GLOBAL TECHNOLOGY OPERATIONS LLC, Detroit, MI (US)

(72) Inventors: Aruna Jammalamadaka, Agoura Hills, CA (US); Rajan Bhattacharyya, Sherman Oaks, CA (US); Michael J Daily, Thousand Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 129 days.

(21) Appl. No.: 16/047,872

(22) Filed: Jul. 27, 2018

(65) Prior Publication Data

US 2020/0033855 A1 Jan. 30, 2020

(51) Int. Cl.
| | |
|---|---|
| *B60W 50/00* | (2006.01) |
| *G05D 1/00* | (2006.01) |
| *G06N 7/00* | (2006.01) |
| *G05D 1/02* | (2020.01) |

(52) U.S. Cl.
CPC .......... *G05D 1/0088* (2013.01); *B60W 50/00* (2013.01); *B60W 50/0097* (2013.01); *G05D 1/0212* (2013.01); *G06N 7/005* (2013.01); *B60W 2050/0075* (2013.01)

(58) Field of Classification Search
CPC .............. B60W 50/00; B60W 50/0097; G05D 1/0088; G06N 7/005
See application file for complete search history.

(56) References Cited

U.S. PATENT DOCUMENTS

| | | | | |
|---|---|---|---|---|
| 8,457,827 B1* | 6/2013 | Ferguson | ............. | G05D 1/0088 701/23 |
| 9,495,874 B1* | 11/2016 | Zhu | ......................... | G06N 20/00 |
| 9,501,932 B2* | 11/2016 | Sakai | ..................... | G08G 1/161 |
| 2018/0053093 A1* | 2/2018 | Olabiyi | ................ | G06N 3/0454 |

(Continued)

OTHER PUBLICATIONS

He, Lei; Zong, Chang-fu; Wang, Chang; "Driving intention recognition and behavior prediction based on a double-layer hidden Markov model"; Journal of Zhejiang University—Science C; 2012 13(3): p. 208-217. (Year: 2012).*

(Continued)

*Primary Examiner* — Anshul Sood
(74) *Attorney, Agent, or Firm* — Lorenz & Kopf LLP (57) ABSTRACT

Systems and method are provided for controlling a vehicle. In one embodiment, a method includes: receiving sensor data sensed from an environment associated with the vehicle; processing, by a processor, the sensor data to determine observation data, the observation data including differential features associated with an agent in the environment; determining, by the processor, a context associated with the agent based on the observation; selecting, by the processor, a first probability model associated with the context; processing, by the processor, the observation data with the selected first probability model to determine a set of predictions; processing, by the processor, the set of predictions with a second probability model to determine a final prediction of interaction behavior associated with the agent; and selectively controlling, by the processor, the vehicle based on the final prediction of interaction behavior associated with the agent.

16 Claims, 5 Drawing Sheets

(56) References Cited

U.S. PATENT DOCUMENTS

| | | | | |
|---|---|---|---|---|
| 2018/0143644 A1* | 5/2018 | Li | ................... | G05D 1/0221 |
| 2019/0122037 A1* | 4/2019 | Russell | ................ | G05D 1/0276 |
| 2019/0354105 A1* | 11/2019 | Cunningham | ....... | G05D 1/0088 |
| 2019/0391580 A1* | 12/2019 | Di Cairano | .......... | G05D 1/0217 |

OTHER PUBLICATIONS

Laugier, Christian; Paromtchik, Igor E.; Perrollaz, Mathias; Yong, Mao; "Probabilistic Analysis of Dynamic Scenes and Collision Risks Assessment to Improve Driving Safety"; IEEE Intelligent Transportation Systems Magazine, Winter 2011: p. 4-19.; Oct. 28, 2011. (Year: 2011).*

1. Rabiner, L. R. (1989). A tutorial on hidden Markov models and selected applications in speech recognition. Proceedings of the IEEE, 77(2), 257-286.

Choi, Hyungwon, et al. "Sparsely correlated hidden Markov models with application to genome-wide location studies." Bioinformatics 29.5 (2013): 533-541.

Lefèvre, Stéphanie, et al. "Intention-Aware Risk Estimation: Field Results." IEEE International Workshop on Advanced Robotics and its Social Impacts. 2015.

Gindele, Tobias, Sebastian Brechtel, and Rudiger Dillmann. "Learning driver behavior models from traffic observations for decision making and planning." IEEE Intelligent Transportation Systems Magazine 7.1 (2015): 69-79.

Tibshirani, R. (1996). Regression shrinkage and selection via the lasso. J. Royal. Statist. Soc. B, 58(1), 267-288.

Yoo, YoungJoon, et al. "Visual Path Prediction in Complex Scenes With Crowded Moving Objects." Proceedings of the IEEE Conference on Computer Vision and Pattern Recognition. 2016.

Brand, Matthew, Nuria Oliver, and Alex Pentland. "Coupled hidden Markov models for complex action recognition." Computer vision and pattern recognition, 1997. proceedings., 1997 ieee computer society conference on. IEEE, 1997.

Khreich, Wael, et al. "A survey of techniques for incremental learning of HMM parameters." Information Sciences 197 (2012): 105-130.

Renals, Steve and Bell, Peter. "Hidden Markov Models and Gaussian Mixture Models". ASR Lectures 4&5 http://www.ee.iisc.ac.in/people/faculty/prasantg/downloads/asr03-hmmgmm-4up.pdf.

J. Friedman, T. Hastie, H. Hoefling, and R. Tibshirani, "Pathwise coordinate optimization," Ann. Appl. Stat., vol. 41, pp. 164-171, 2008.

* cited by examiner

SYSTEMS AND METHODS FOR PREDICTING ENTITY BEHAVIOR

TECHNICAL FIELD

The present disclosure generally relates to autonomous vehicles, and more particularly relates to systems and methods for predicting behavior of various entities or agents within an environment of an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle and perform traffic prediction.

While recent years have seen significant advancements in behavior prediction systems, such systems might still be improved in a number of respects. For example, an autonomous vehicle will typically encounter, during normal operation, a large number of vehicles and other objects, each of which might exhibit its own, hard-to-predict behavior. That is, even when an autonomous vehicle has an accurate semantic understanding of the roadway and has correctly detected and classified objects in its vicinity, the vehicle may yet be unable to accurately predict the trajectory and/or paths of certain objects in a variety of contexts.

Accordingly, it is desirable to provide systems and methods that are capable of predicting the behavior of various entities or agents encountered by an autonomous vehicle. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving sensor data sensed from an environment associated with the vehicle; processing, by a processor, the sensor data to determine observation data, the observation data including differential features associated with an agent in the environment; determining, by the processor, a context associated with the agent based on the observation; selecting, by the processor, a first probability model associated with the context; processing, by the processor, the observation data with the selected first probability model to determine a set of predictions; processing, by the processor, the set of predictions with a second probability model to determine a final prediction of interaction behavior associated with the agent; and selectively controlling, by the processor, the vehicle based on the final prediction of interaction behavior associated with the agent.

In various embodiments, the differential features include acceleration and a difference in heading. In various embodiments, the differential features include an x and y location. In various embodiments, the context is determined from the x and y location. In various embodiments, the context is associated with a lane in which the agent is travelling. In various embodiments, the context is determined by using a sorted pairwise distance between an x and y location of the agent to a centerline of the lane, and mapping the lane to the context. In various embodiments, the first probability model is a Gaussian Mixture Model-Hidden Markov Model.

In various embodiments, the method includes performing unsupervised training of the Gaussian Mixture Model-Hidden Markov Model based on the context. In various embodiments, the second probability model is a sparsely correlated Hidden Markov Model. In various embodiments, the method further includes performing unsupervised training of the sparsely correlated Hidden Markov Model based on the context.

In another embodiment, a system includes: a sensor system configured to observe an agent in an environment associated with the vehicle and to produce sensor data based thereon; and a prediction module configured to, by a processor, receive the sensor data, process the sensor data to determine observation data including differential features associated with an agent, determine a context associated with the agent based on the observation, select a first probability model associated with the context, process the observation data with the selected first probability model to determine a set of predictions, process the set of predictions with a probability model to determine a final prediction of interaction behavior associated with the agent, and selectively control the vehicle based on the final prediction of interaction behavior associated with the agent.

In various embodiments, the differential features include acceleration and a difference in heading. In various embodiments, the differential features include an x and y location. In various embodiments, the context is determined from the x and y location. In various embodiments, the context is associated with a lane in which the agent is travelling. In various embodiments, the context is determined by using a sorted pairwise distance between an x and y location of the agent to a centerline of the lane, and mapping the lane to the context. In various embodiments, the first probability model is a Gaussian Mixture Model-Hidden Markov Model. In various embodiments, the prediction module performs unsupervised training of the Gaussian Mixture Model-Hidden Markov Model based on the context. In various embodiments, the second probability model is a sparsely correlated Hidden Markov Model. In various embodiments, the prediction module performs unsupervised training of the sparsely correlated Hidden Markov Model based on the context.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
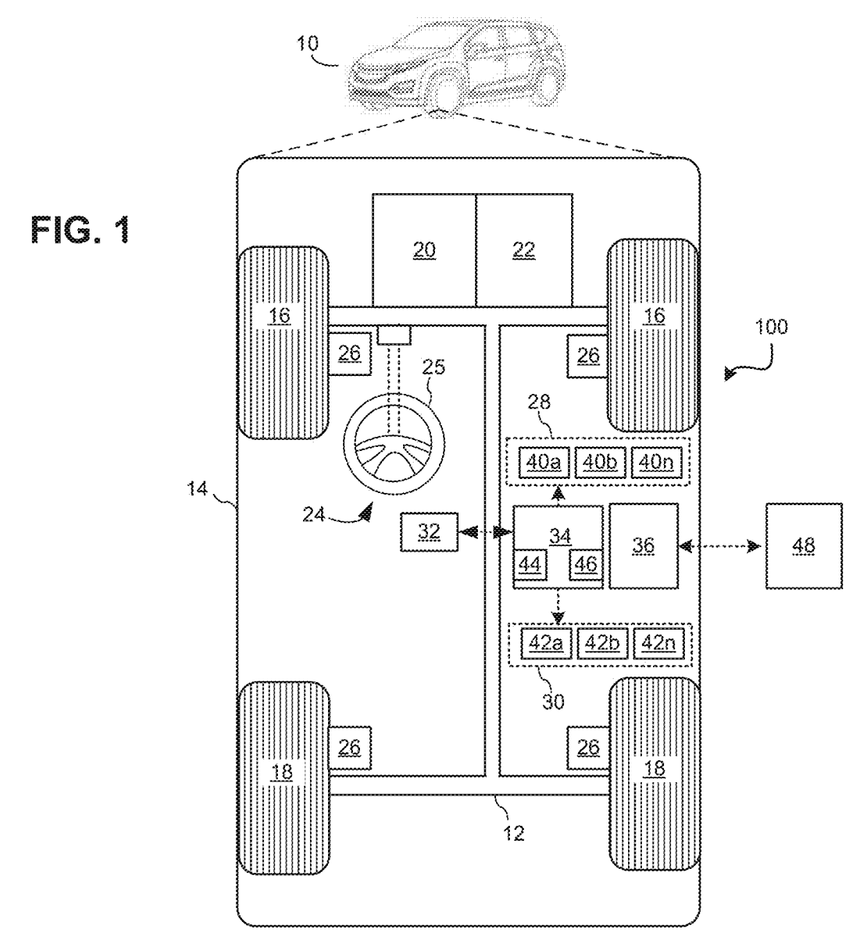
FIG. 1 is a functional block diagram illustrating an autonomous vehicle having an entity behavior prediction system, in accordance with various embodiments.

With reference to FIG. 1, an entity behavior prediction system shown generally as 100 is associated with a vehicle 10 in accordance with various embodiments. In general, entity behavior prediction system (or simply "system") 100 is configured to predict the future path (or "trajectory") of entities within a scene based on observations related to those entities. As used herein the term "entities" also referred to herein as "agents" refers to other vehicles, bicycles, objects, pedestrians, or other moving elements or actors within an environment of the vehicle 10.

In various embodiments, the entity behavior prediction system 100 uses at least two probability models including a Gaussian Mixture Model-Hidden Markov Model (GMM-HMM) and a sparsely correlated Hidden Markov Model (scHMM) to model interactions between agents associated with certain contexts in order to make the predictions.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the entity behavior prediction system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, the controller 34 is configured to predict the behavior of entities or agents in the vicinity of the AV 10 using at least two probability models including a Gaussian Mixture Model-Hidden Markov Model and a sparsely correlated Hidden Markov Model.

Figure 2:
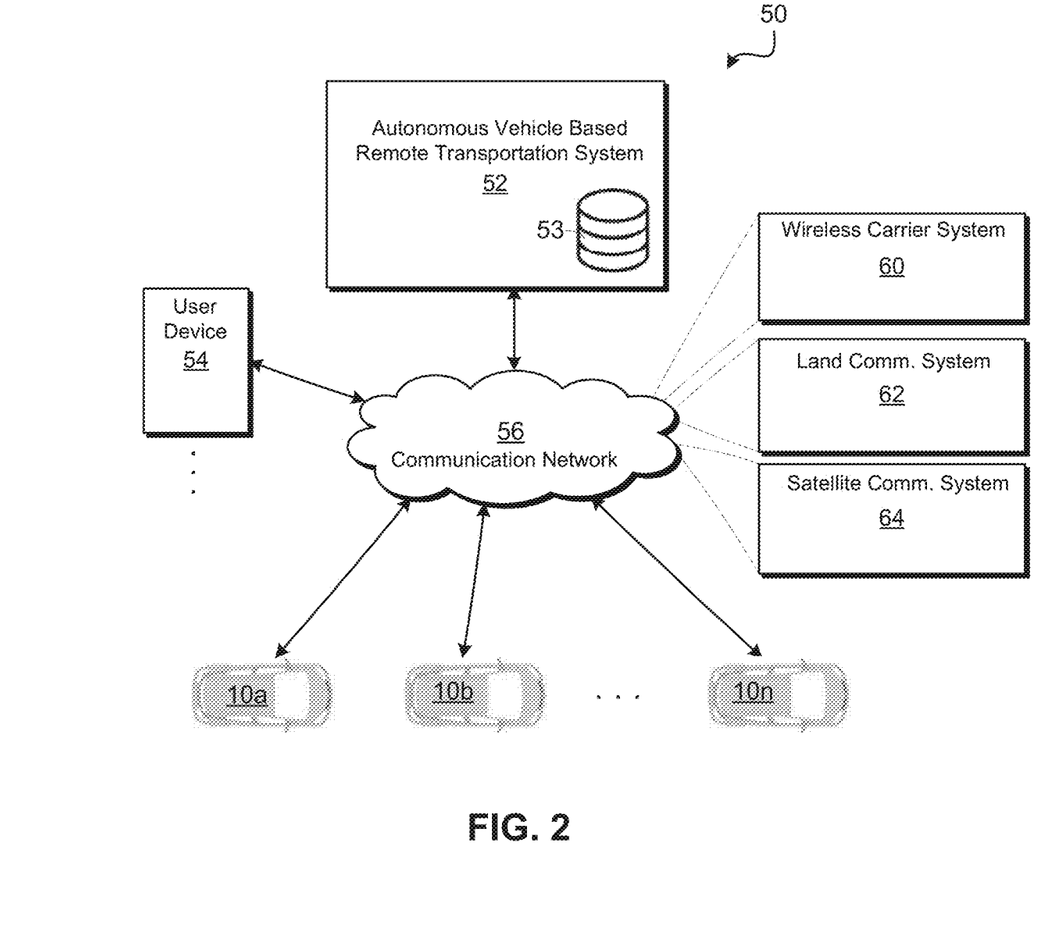
FIG. 2 is a functional block diagram illustrating a transportation system having one or more autonomous vehicles as shown in FIG. 1, in accordance with various embodiments.

The communication system 36 is configured to wirelessly communicate information to and from other computing systems 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to the computing systems 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes and also may be used to perform traffic pattern prediction.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
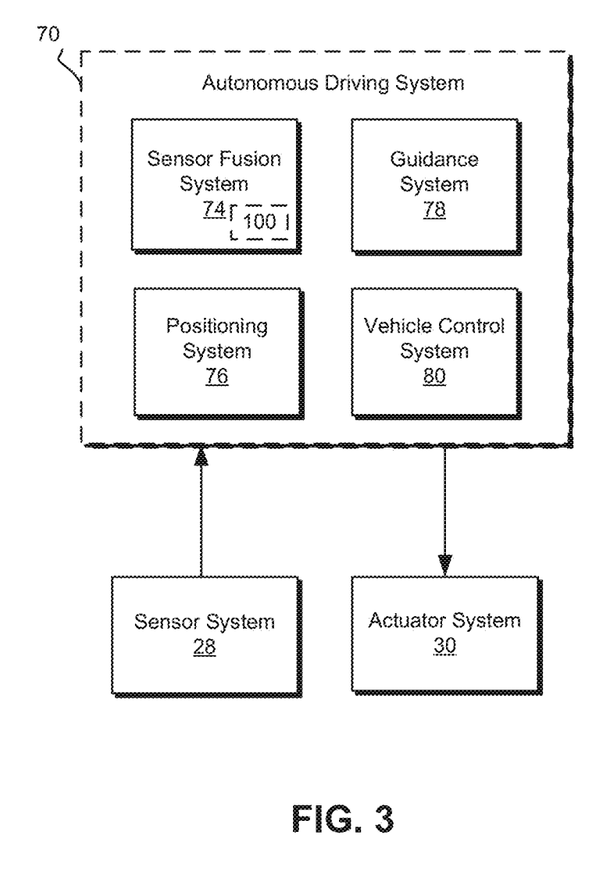
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the entity behavior prediction system 100 is configured to predict the behavior of entities or agents in the vicinity of AV 10 using at least two probability models and iteratively improve those predictions over time based on observations of those objects. In some embodiments, all or parts of the system 100 are incorporated into the sensor fusion system 74 of FIG. 2.

Figure 4:
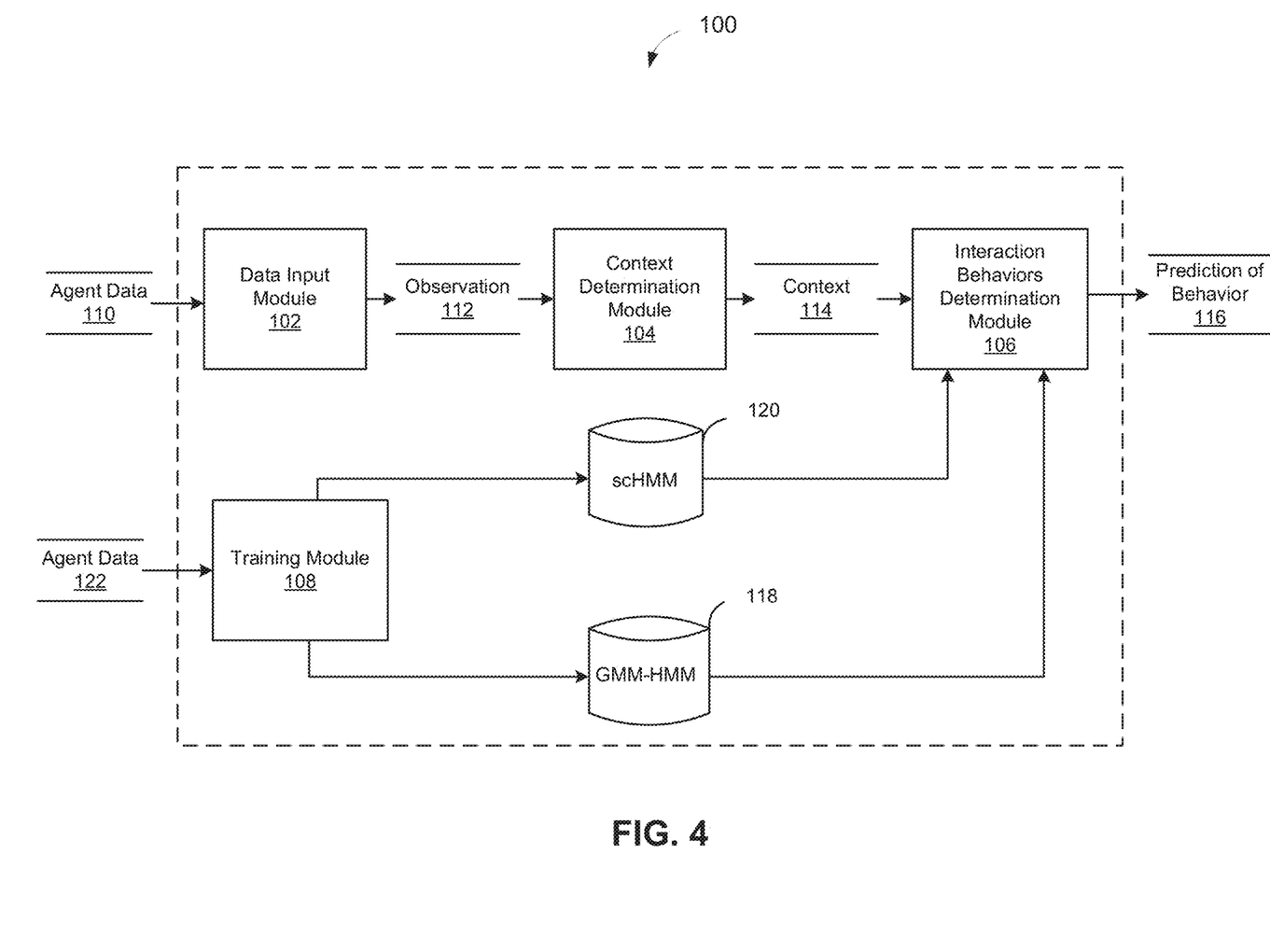
FIG. 4 is a dataflow diagram illustrating an entity behavior prediction module, in accordance with various embodiments.

In that regard, FIG. 4 is a dataflow diagram illustrating aspects of the entity behavior prediction system 100 in more detail. With reference now to FIG. 4 and with continued reference to FIGS. 1-3, it will be understood that the sub-modules shown in FIG. 4 can be combined and/or further partitioned to similarly perform the functions described herein. Inputs to modules may be received from the sensor system 28, received from other control modules (not shown) associated with the autonomous vehicle 10, received from the communication system 36, and/or determined/modeled by other sub-modules (not shown) within the controller 34 of FIG. 1. The modules generally perform the functions of computing differential features on individual agent trajectories, feeding the differential features into a Gaussian Mixture Model-Hidden Markov Model (GMM-HMM), and then finding a sparsely correlated HMM (scHMM) which selects the necessary connections between independent HMMs for modeling high-level contextual interactions between the agents. The high level contextual interactions are then used to predict behavior of the agent. The GMM-HMM and the scHMM can both trained in a supervised or an unsupervised manner to learn the behavioral interactions. Thus, in various embodiments, the entity behavior prediction system 100 may include a data input module 102, a context determination module 104, an interaction behaviors determination module 106, and a training module 108.

In various embodiments, the data input module 102 receives agent data 110 (i.e., x, y, velocity, heading angle, and/or other data sampled at 20 Hz or some other sample rate) associated with a particular agent. The agent data 110 is accumulated until ten samples (or some other sample amount) have been stored. Once this occurs, an observation 112 has been captured. The difference in velocity (acceleration) and the difference in heading angle for each sample are concatenated to form a twenty-dimensional (20D) feature vector per observation. The feature vector of the observation 112 contains the differential features of the agent.

In various embodiments, the context determination module 104 receives the observation 112 and uses the x and y locations from that observation 112 to identify a context 114. For example, any driving scenario may have any number of pre-defined contexts. The x and y locations can be used to select the current context associated with the agent from the pre-defined contexts. In one example, the contexts can signify lanes in which moving agents exhibit similar behaviors (i.e. right turn, lane change, left turn etc.). In such embodiments, the correct context for each observation is found by using a sorted pairwise distance between the true x and y coordinates of the agent to a centerline of each lane, and then mapping the lane to the context. As can be appreciated, the contexts can signify other features and can be determined according to other methods and are not limited to the present examples.

The interaction behaviors determination module 106 receives the context 114 and selects a trained Gaussian Mixture Model-Hidden Markov Model (GMM-HMM) 118 that corresponds to that context from any number of trained GMM-HMMs. The interaction prediction module 106 uses the selected trained GMM-HMM 118, for example, to predict the next five or some other number of states/observations (e.g., 2.5 seconds worth of states/observations) of differential features (including the acceleration and the difference in heading angle) also referred to as a predicted sequence of states. The interaction behaviors determination module 106 then uses the selected trained GMM-HMM 118 to determine the next fifty or other number of samples (at 20 Hz or some other sample rate) of x and y locations based on the current x and y values and the predicted states/observations.

As can be appreciated, when a second observation 112 for a same agent is accumulated by the data input module 102, the functions of the context determination module 104 and the interaction behaviors determination module 106 are repeated, using the most recent x and y location to define the context (since agents may change lanes). In other words a history of states/observations for an agent can be accumulated, for example, the Viterbi algorithm or another algorithm, to make the final prediction.

The interaction behaviors determination module 106 then processes the predicted sequence of states/observations and predicted locations with a trained sparsely correlated Hidden Markov Model (scHMM) 120. The output of the scHMM 120 includes predictions 116 of hidden states or interactions between the contexts.

In various embodiments, the interaction behaviors determination module 106 processes the predicted sequence with a trained scHMM to produce the interactions. In this embodiment, the processing is a two-step process where the trained GMM-HMM is performed first and the trained scHMM is performed second.

In various other embodiments, the interaction behaviors determination module 106 processes the observations with a trained GMM-scHMM to produce the interactions. For example, the sparsely correlated scHMM models the interactions between contexts and can be fit using the historical state sequences which result from the trained GMM-HMM. This combined model can be referred to as a GMM-scHMM. In such embodiments, the GMM-scHMM processes the observations 112 to characterize each observation 112 as a state in the GMM-scHMM model. This combined model provides the probability that an agent is in (or will be in) a particular state given the states of the other agents in other contexts. The GMM allows for the use of continuous data, as opposed to discrete states used by a scHMM.

In various embodiments, the emission probabilities are learned using a GMM, and the transition probabilities learned in the GMM-HMM are updated by the constraints of the scHMM. Thus, the emission probabilities learned via the GMM, and the interaction-constrained emission probabilities learned via the scHMM are used to predict the future states of each agent in the scene.

In various embodiments, the state sequences of all agents can be optimized and predicted at once, or they can be predicted one at a time using information from all other agents.

As mentioned briefly above, the GMM-HMM 118 and the scHMM 120 can be trained in a supervised or unsupervised manner. In various embodiments, the training module 108 trains the GMM-HMM 118 and the scHMM 120 such that they can be used for various contexts. For example, a Gaussian Mixture Model-Hidden Markov Model (GMM-HMM) is an HMM with Gaussian mixture emissions. This means that the output probability density function is modeled as a Gaussian mixture. The transition matrix $T_{jk}=(s_j|s_k)$ gives the probability of transitioning from one state to another. The emission probabilities for each state $(x|s_j)$ are modeled as a GMM and are maximized in order to map the 20D acceleration and heading angle observations to a particular state. In one example, the GMM contains only one Gaussian component. Both the transition and emission probabilities are estimated during training. This is done by specifying the total number of states, and a total number of Gaussians per state, computing initial parameter estimates of the GMM, and then computing the maximum likelihood estimates of the GMM-HMM parameters using, for example, an expectation-maximization (EM) algorithm.

In various embodiments, the number of states can be determined by model selection criterion such as, but not limited to, the Aikake or Bayesian Information Criterion (AIC or BIC), and can vary with the complexity of the trajectories, and the number of Gaussian components per state can be one for all contexts. During training, the differential features described above are collected from agent data 122 and contiguous sub-sequences of these features which correspond to the same context are used to train contextual GMM-HMMs 118. The context for each agent can be determined, for example, as discussed above.

In various embodiments, the training module 108 trains the scHMM 120 by learning interactions between the agents (such as right of way) in order to create a prior model for expected agent behavior conditional upon context and other agents in a given scenario. In a scHMM, a single HMM is assumed for each agent, and the state transition probability for each agent depends not only on their own hidden state, but also on the hidden states of other related agents. For each series of GMM-HMM states, the scHMM uses penalized regression to select a subset of the other data series and estimate their effects on the odds of each transition in the given series. After this, hidden states are inferred using a standard forward-backward algorithm with the transition probabilities adjusted by the model for each time window, which helps retain an order of computation close to fitting independent HMMs (iHMM), which we have already tested to be near real-time for this system. The scHMM framework selects only necessary connections between independent HMMs for modeling high-level contextual/agent interactions, and is more computationally efficient than a fully coupled HMM.

Using the GMM-HMM state sequences derived from the training process described above, and limiting our training data to multiple-actor scenarios where actors are approaching or within the intersection during an overlapping time frame (i.e. where behavioral interactions will play a role), the scHMM 120 is trained to identify contextual interactions. Assume there are N series, and $x=\{x_n^t\}$ denotes the observed feature at time t in series n for t=1 . . . T and n=1 . . . N. The observed data x are associated with states $s=\{s_n^t\}$ based on the GMM-HMM emission probabilities described above. Instead of determining the hidden states by considering all N series simultaneously, parameters are iteratively inferred by cycling through each series individually and performing inference by conditioning on the current hidden states of all other series. In addition, sparsity is assumed when incorporating correlations between the current series and all other series. The transition matrix defined above $T_{jk}$ becomes $T_{jk}^t$ because the transition probabilities can vary with time. The elements of T are thus defined in terms of a multinomial logistic regression instead of a logistic regression because the GMM-HMM states take on more than just binary values. The transition probabilities are defined such that they incorporate input from other series as follows:

$$T_{jk} = P(s_n^t = k \mid s_n^{t-1} = j) = \frac{e^{\beta_{njk}^t}}{1 + \sum_{(m \neq n)} e^{\beta_{mnjk}^{t-1} s_m^{t-1} + \beta_{mnjk}^t s_m^t}}. \quad (1)$$

Where n is the current series, and m is the index of other series, s. $\beta_{mnjk}^{t-1}$ and $\beta_{mnjk}^t$ are the increase in log odds of a transition from state j to state k in series n when previous and current time points are in state k in series m (mm≠aa) respectively. To address the sparsity in the number of regression coefficients, a penalty is imposed such that $\Sigma_{mm\neq}(|\beta_{mnjk}^{t-1}|+|\beta_{mnjk}^t|) \leq \lambda\lambda$. The estimation procedure for the scHMM involves estimation of the regression parameters via coordinate descent. Hidden states and transition probabilities are updated iteratively by running through the series one by one as described above. Thus, the training module 108 pre-trains the scHMM 120 to estimate correct sparse correlations between state sequences of separate contexts and then uses these connections at run time to determine hidden states instead of using independent contextual GMM-HMMs.

Figure 5:
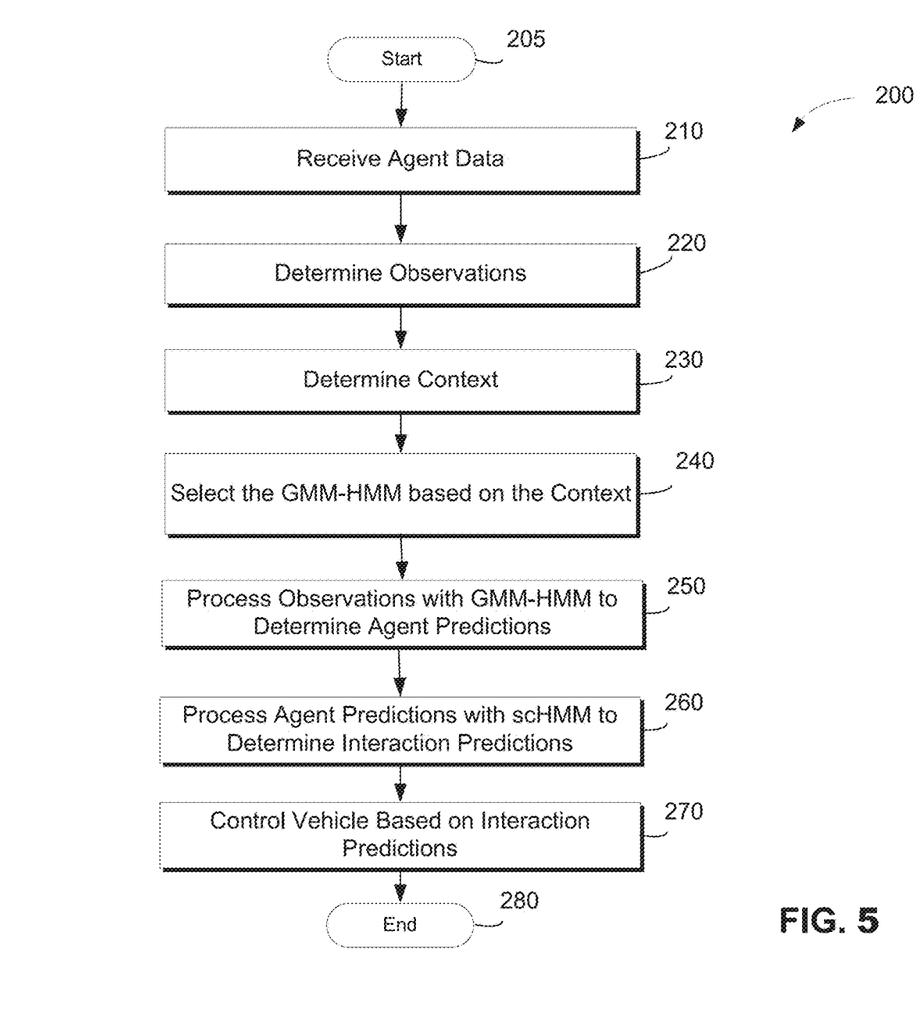
FIG. 5 is a flowchart illustrating a control method for controlling the autonomous vehicle, in accordance with various embodiments.

Referring now to FIG. 5 and with continued reference to FIGS. 1-4, a flowchart illustrates a control method 200 that can be performed by the system 100 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 200 can be scheduled to run based on one or more predetermined events, and/or can run continuously during operation of the autonomous vehicle 10.

In one example, the method 200 may begin at 205. The agent data 110 is received at 210. The agent data 110 is processed by, for example, the data input module 102 to determine the observations 112 that include the differential features at 220. The location of the observations is then used to determine the context 114 at 230. The corresponding GMM-HMM 118 is then selected based on the context 114 at 240. The history of the observations 112 is then processed by the corresponding GMM-HMM 118 to provide predictions at 250. The predictions are processed by the scHMM 120 to provide a final prediction of interaction behavior at 260. Thereafter, the final prediction may be used to control the vehicle 10 at 270 and the method may end at 280.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
receiving sensor data sensed from an environment associated with the vehicle;
processing, by a processor, the sensor data to determine observation data, the observation data including differential features associated with an agent in the environment;
determining, by the processor, a context associated with the agent based on the observation data;
selecting, by the processor, a first probability model associated with the context from a plurality of probability models, wherein each of the plurality of probability models are trained Gaussian Mixture Model-Hidden Markov Models for an associated context;
processing, by the processor, the observation data with the selected first probability model to determine a set of predictions;
processing, by the processor, the set of predictions with a second probability model to determine a final prediction of interaction behavior associated with the agent, wherein the second probability model is a trained sparsely correlated Hidden Markov Model; and
selectively controlling, by the processor, the vehicle based on the final prediction of interaction behavior associated with the agent.

2. The method of claim 1, wherein the differential features are associated with an acceleration and a heading.

3. The method of claim 1, wherein the differential features include an x and y location.

4. The method of claim 3, wherein the context is determined from the x and y location.

5. The method of claim 1, wherein the context is associated with a lane in which the agent is travelling.

6. The method of claim 5, wherein the context is determined by using a sorted pairwise distance between an x and y location of the agent to a centerline of the lane, and mapping the lane to the context.

7. The method of claim 1, further comprising performing unsupervised training of the Gaussian Mixture Model-Hidden Markov Models based on the context.

8. The method of claim 1, further comprising performing unsupervised training of the sparsely correlated Hidden Markov Model based on the context.

9. A system for controlling a vehicle, comprising:
a sensor system configured to observe an agent in an environment associated with the vehicle and to produce sensor data based thereon; and
a prediction module configured to, by a processor, receive the sensor data, process the sensor data to determine observation data including differential features associated with an agent, determine a context associated with the agent based on the observation data, select a first probability model associated with the context from a plurality of probability models, wherein each of the plurality of probability models is a trained Gaussian Mixture Model-Hidden Markov Model for an associated context, process the observation data with the selected first probability model to determine a set of predictions, process the set of predictions with a second probability model to determine a final prediction of interaction behavior associated with the agent, wherein the second probability model is a trained sparsely correlated Hidden Markov Model, and selectively control the vehicle based on the final prediction of interaction behavior associated with the agent.

10. The system of claim 9, wherein the differential features are associated with an acceleration and a heading.

11. The system of claim 9, wherein the differential features include an x and y location.

12. The system of claim 11, wherein the context is determined from the x and y location.

13. The system of claim 9, wherein the context is associated with a lane in which the agent is travelling.

14. The system of claim 13, wherein the context is determined by using a sorted pairwise distance between an x and y location of the agent to a centerline of the lane, and mapping the lane to the context.

15. The system of claim 9, wherein the prediction module performs unsupervised training of the Gaussian Mixture Model-Hidden Markov Model based on the context.

16. The system of claim 9, wherein the prediction module performs unsupervised training of the sparsely correlated Hidden Markov Model based on the context.

* * * * *